July 11, 1939.  G. NANCARROW  2,165,937
RACE STARTING DEVICE
Filed March 12, 1938  2 Sheets-Sheet 1

Inventor
George Nancarrow
By Frederick C. Bromley
ATTY

July 11, 1939.  G. NANCARROW  2,165,937
RACE STARTING DEVICE
Filed March 12, 1938  2 Sheets-Sheet 2
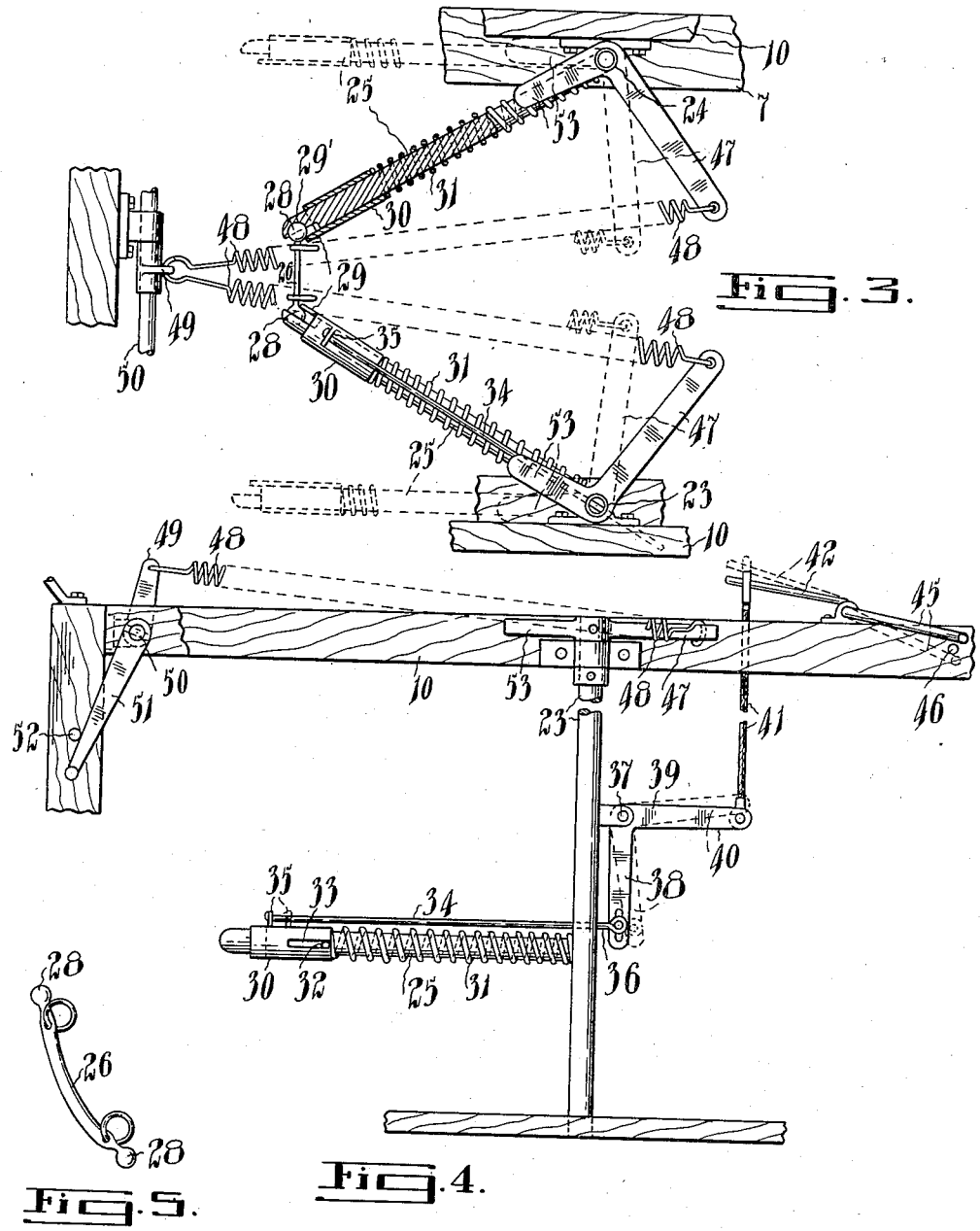
Inventor
George Nancarrow
by Frederick C. Bromley
ATTY

Patented July 11, 1939

2,165,937

UNITED STATES PATENT OFFICE 2,165,937

RACE STARTING DEVICE

George Nancarrow, Toronto, Ontario, Canada, assignor of one-tenth to Dorothy Downey, Toronto, Ontario, Canada Application March 12, 1938, Serial No. 195,470

7 Claims. (Cl. 119—15.5)

The invention appertains to starting devices for horse races in which the horses are separately constrained at the starting line by mechanism adapted for quick and concurrent release of the animals at the moment the race commences.

The invention has for its general object the provision of a highly efficient and reliable mechanism by which several horses may be individually secured in alignment in a series of stalls and released therefrom by a common actuating appliance. The mounts are positively held in check by arms arranged in pairs and connected to the bridles by a quick-release connection. The mechanism is adapted to be tensioned upon its attachment to the bridles so that each pair of arms when released will fly apart to instantly free the mount held thereby.

Having briefly recounted the general object and nature of the invention, subsidiary objects and advantages will be apparent from the ensuing detailed description.

Referring to the accompanying drawings, Figure 1 is a fragmentary perspective view of the invention applied to a portable starting machine in which a horse is shown in secured position in one of the stalls.

Figure 3 is a fragmentary plan view, on an enlarged scale, of a stall showing a pair of arms clutching a bridle bit. The released positions of the arms are denoted in dash lines.

Figure 4 is a fragmentary side elevation of a stall showing an arm together with the tensioning means and the release means.

Figure 5 is a detail of a bit incorporating ball members for connection to the gripping arms.

Like numerals of reference denote similar parts in each figure of the drawings.

Figure 1:
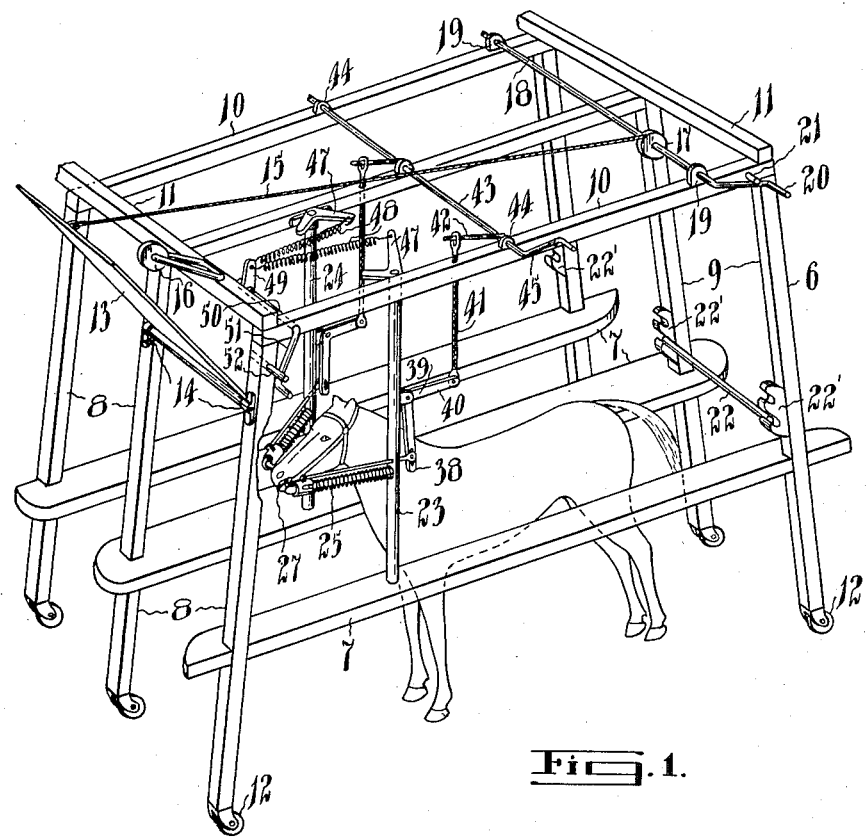

In the drawings, the reference numeral 6 generally denotes the frame of the starting machine, which frame may be of any suitable construction such as to provide a sufficiency of stalls to accommodate the number of horses entered in a race in which the machine is employed. The frame, by way of illustration, comprises partitions, consisting of rails 7, front uprights 8 and rear uprights 9. The rails and their respective uprights are rigidly secured together in approved manner. The partitions, thus formed, are suitably spaced apart to produce stalls in row formation. As customary, each stall accommodates a horse and is open at both ends. It will be observed that only two stalls are represented in Figures 1 and 2 of the drawings, but in actual practice there will of course be more to a starting device.

The uprights 8 and 9 are joined at their tops by longitudinal bars 10 and crossbars 11, which serve to complete the frame structure. The uprights are preferably supplied with castors as at 12 so that the frame may be wheeled on and off the track and also readily shifted into required position on the track to suit a contemplated race.

Figure 2:
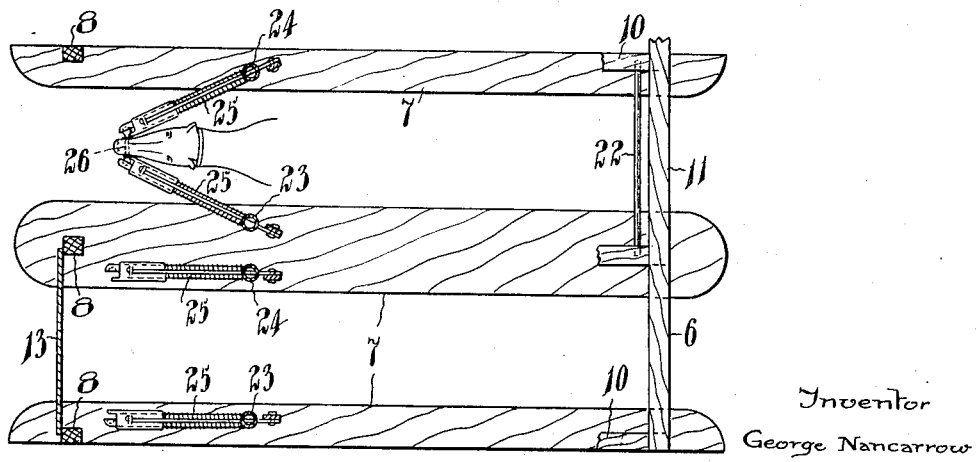
Figure 2 is a plan view, partially in section, of Figure 1, in which a pair of arms of one of the stalls is illustrated as attached to a bridle of a horse. The pair of arms of the other stall are depicted in freed position.

Adverting to Figures 1 and 2, a gate 13 is furnished at the front of each stall, although only one is shown on the frame in order to render the invention more discernible. The gate is hinged as at 14 on a horizontal axis adjacent to the top of the frame. It is swingable downward from the open position in which it is shown to a closed position for blocking the exit of the stall, and may be there secured if desired. To operate the gate a flexible element, such as the rope 15, is attached to its distal portion and trained over a projecting pulley 16 from whence the rope is directed to a reel 17. The rope is secured to the reel for winding thereon. The reel is secured to a shaft 18 extending transversely of the stalls and journalled in bearings as at 19. It will be understood that the complement of stalls shall each have a reel on the portion of the shaft extending thereacross for controlling the gate thereof. The shaft is supplied with a crank 20 whereby it may be manually turned for lowering and raising the gates in unison. A locking pin 21 of the sliding type is employed to secure the crank when the gates are to be held raised.

The gates are lowered before leading the horses into the stalls and when they have entered, bars such as shown at 22 are fitted in notched elements 22' at the rear of the stalls. The gates and the bars are used while the horses are being secured to the quick-release mechanism hereinafter recounted.

Inasmuch as the devices for constraining the horses in the stalls are identical, a description of one set for a single stall will suffice. This mechanism comprises a pair of vertical rocker shafts 23 and 24, one of the rocker shafts being mounted upon one of the component partitions of the stall and the other being mounted on the complementary partition thereof. For this purpose, the lower ends of the rocker shafts may be journalled in the rails 7 and the upper ends may be journalled on the longitudinal bars 10, as herein shown.

Each rocker rigidly carries a forwardly directed arm 25 having a quick-detachable connection at its distal end for engagement with the bit 26 of a bridle 27. This connection comprises a specially constructed bit involving the provision at each end of a ball projection as at 28 which may be referred to simply as a "ball". The free terminus of each arm is inwardly recessed to furnish a socket 29' receptive to the ball at that side of the bridle. The ball is retained in the socket by a finger 29 forwardly protruding from a sleeve 30 encircling the arm and slidable thereon in lengthwise direction. The sleeve is normally forwardly urged by a compression spring 31 encircling the arm and shouldered thereon. The forward tension thus applied on the finger is sufficient to lock the ball in the socket and yet permit the ball to turn with the bit incidental to movement of the horse's head. The ball and socket connection of each arm thus secures the bit in a readily detachable manner.

The sleeve 30 of each arm is supplied with means to preclude its turning so as to retain the finger 29 thereof in alignment with the socket at the distal end. Said means consist of a pin 32 engaged with a slot 33 in the sleeve and axially directed. This structure is shown to best advantage in Figure 4.

The release mechanism for each of the ball and socket connections comprehends a rod 34 co-extensive with an arm and having its forward end slidably inserted in a lug 35 united with the sleeve thereof. The rod is enlarged beyond the lug to supply a shoulder such as to abut the same for the purpose of retracting the sleeve together with its finger when the rod is pulled rearwardly. The rod has its rear extent slidably fitted in an aperture of the respective rocker shaft and extended therebeyond. The rear end 36 is attached to an arm 38 of a bellcrank 39 by a pin and slot connection. The bellcrank is fulcrumed at 37 to the rocker shaft and has its other arm 40 swivelly attached to a flexible rod or cable 41 guidably constrained for lengthwise movement and connected at its upper end to a trip bar 42. The cable accommodates the turning or oscillatory movement of the rocker shaft as the arm is swung toward and away from the horse's head.

The release mechanism just described operates as follows: When an upward pull is exerted on the cable by the trip bar, the bellcrank imparts a pull on the rod 34 which in turn retracts the sleeve against its spring pressure. The finger is thus disengaged from the ball of the bit. The arm is then free to swing outwardly.

To release the constraining arms of the stalls simultaneously, the trip bar of each release mechanism is radially carried by an overhead shaft 43 running transversely of the group of stalls and journalled as at 44. This shaft is supplied with a lever 45 by which it may be manually turned by an attendant to raise the trip bars. A slidable pin 46 is used to lock the lever 45 when the trip bars are raised.

Each constraining arm 25 is furnished with a tensioning mechanism consisting of an arm 47 radially secured to the rocker shaft thereof and connected to an extremity of a tension spring 48. The spring has its other extremity connected to an arm 49 of a shaft 50 journalled on the frame and supplied with a crank 51. The shaft 50 extends across the group of stalls so that the constraining arms thereof shall be tensioned in unison by turning the crank 51 in a direction to elongate the springs 48 belonging to the individual stalls. When the crank has been so turned, it is locked by pulling out a slidable pin 52 or otherwise securing it in a determined position.

It will be manifest that when the spring 48 of a rocker shaft is tensioned, it will exert resilient pressure on the arm 47 in a direction tending to turn the rocker shaft outwardly. Consequently, the moment the arm 25 is freed from the bit the tensioning pressure swings this arm outwardly to the position denoted in dash lines in Figure 3, the outward movement being limited by a stop 53.

From the foregoing description it will be clear that the invention provides a starting device embodying a plurality of stalls each equipped with a pair of co-operating arms 25 that can be manually swung inwardly while untensioned, and detachably connected to the ball ends of the bit of the horse led into a stall. Furthermore, it will be clear that when the horses are secured in this fashion the said arms can be tensioned by the crank 51 and simultaneously freed at the start of a race by the quick-release means actuated by the manual lever 45.

What I claim is:

1. In a starting device for horse races, in combination, individual constraining means including rigid arms opposingly supported for swinging inwardly toward each other for connection to the bridle of each horse, separable means affording a detachable connection between the arms and the bridle, release means for disconnecting said separable means, means adapted to be operated simultaneously as by an attendant to actuate said release means, and mechanism for tensioning said arms to cause them to fly outward when released from the bridle.

2. In a starting device for horse races, in combination, two swingable constraining arms for each horse, one of said arms being attached at one of its ends to a portion of one side of the bridle of the horse and its other end being swingably supported relatively to a permanent part of the race course, the other constraining arm being attached at one end to a portion of the other side of the bridle and its other end being swingably supported relatively to a permanent part of the race course, release means for detaching said arms from the bridle, resilient means for urging said arms outwardly when detached from the bridle and manually operable means for actuating all of said release means in unison.

3. In a device of the class described, in combination, a quick-detachable connection for securing an animal, comprising a bit, a ball projection thereon, a supported arm having a distal end supplied with a recess in the form of a spherical segment receptive to said ball projection, a finger slidable on the arm toward and away from said recess for engaging said ball projection to lock it in the recess, resilient means urging the finger into such engagement, and means for retracting the finger.

4. In a starting device for horse races, in combination, a series of stalls having partitions, a constraining arm for connecting the bridle of each horse with a partition of a stall, said arm being attached at one end to said partition and having a recess in its other end, a ball projection carried by the bridle for fitting in said recess, a finger slidable on the arm for locking the ball projection in the recess, a spring for urging said finger into such locking engagement, release means for said finger, and means adapted to be operated simultaneously as by an attendant to actuate said release means.

5. In a starting device for horse races, in combination, a series of stalls having partitions, a constraining arm for connecting the bridle of each horse with a partition of a stall, said arm being attached at one end to said partition and having a recess in its other end, a ball projection carried by the bridle for fitting in said recess, a finger, a spring-pressed sleeve slidably mounted on the arm and carrying said finger to cause it to engage the ball projection opposite the aforesaid recess to afford a quick-detachable connection, a rod coextensive with the arm and connected to the sleeve for retracting the finger, an overhead shaft journalled on the partitions and extending across all of the stalls, a manual control for turning said shaft, and release mechanism actuated by the turning of said shaft for simultaneously operating the rods of the arms of the series of stalls.

6. In a starting device for horse races, in combination, a series of stalls having divisional members, a swingable constraining arm for connection between the bridle of each horse and a divisional member of a stall, a rocker shaft journalled on said divisional member and united with an end of the arm to support it for swingable movement in a substantially horizontal plane to and away from said bridle, the other end of said arm having a recess at its inner side, a ball integral with the bit of said bridle for engaging said recess, a spring-pressed finger slidably carried by said arm for resiliently contacting said ball to retain it in said recess, a rod connected to said finger for disengaging it from the recess, a bellcrank fulcrumed on the aforesaid rocker shaft having an arm connected to said rod, a cable connected to the other arm of the bellcrank, a trip bar connected to the cable, an overhead shaft extending transversely of all of the stalls and journalled on the divisional members thereof and radially carrying the trip bars belonging to all of the stalls, and a manual control for turning the last mentioned shaft to operate the trip bars in unison.

7. In a starting device for horse races, in combination, two swingable constraining arms for each horse, one of said arms being attached at one of its ends to a portion of one side of the bridle of the horse and its other end being swingably supported relatively to a permanent part of the race course, the other constraining arm being attached at one end to a portion of the other side of the bridle and its other end being swingably supported relatively to a permanent part of the race course, release means for detaching said arms from the bridle, spring mechanism adapted to be manually tensioned for urging said arms away from the bridle upon detachment of the arms by said release mechanism, and manually operable means for actuating all of said release means in unison.

GEORGE NANCARROW.